United States Patent
Shiue et al.

(10) Patent No.: US 11,416,579 B2
(45) Date of Patent: Aug. 16, 2022

(54) RECURSIVE DISCRETE FOURIER TRANSFORM DEVICE

(71) Applicant: National Central University, Jhongli (TW)

(72) Inventors: Muh-Tian Shiue, Hsinchu (TW); Chih-Feng Wu, Hsin-Chu (TW); Chun-Hung Chen, Zhubei (TW)

(73) Assignee: NATIONAL CENTRAL UNIVERSITY, Jhongli (TW)

( * ) Notice: Subject to any disclaimer, the term of this patent is extended or adjusted under 35 U.S.C. 154(b) by 234 days.

(21) Appl. No.: 17/009,433

(22) Filed: Sep. 1, 2020

(65) Prior Publication Data

US 2022/0067119 A1 Mar. 3, 2022

(51) Int. Cl.
*G06F 17/14* (2006.01)
(52) U.S. Cl.
CPC .................. *G06F 17/141* (2013.01)
(58) Field of Classification Search
CPC ....................................................... G06F 17/141
USPC ........................................................... 708/405
See application file for complete search history.

(56) References Cited

U.S. PATENT DOCUMENTS

| 2005/0276335 A1* | 12/2005 | Kumar | H03H 17/0273 370/210 |
| 2012/0134238 A1* | 5/2012 | Surprenant | H04S 1/007 367/137 |
| 2020/0141986 A1* | 5/2020 | Jaber | G01R 23/167 |

OTHER PUBLICATIONS

Chih-Feng Wu, et al. "A Design of Input-Decimation Technique for Recursive DFT/IDFT Algorithm" on IEEE Transactions on Circuits and Systems—I: Regular Papers, Dec. 2019, pp. 4713-472, vol. 66, No. 12.
Chih-Fengwu, et al., Corrections to "A Design of Input-Decimation Technique for Recursive DFT/IDFT Algorithm" on IEEE Transactions on Circuits and Systems—I: Regular Papers, Jun. 2020, p. 2152, vol. 67, No. 6.
Chih-Feng Wu et al., "A Low-Computation-Cycle Design of Input-Decimation Technique for RIDFT Algorithm" 2019, 27th European Signal Processing Conference (EUSIPCO), Sep. 2, 2019, 5 pages.

* cited by examiner

*Primary Examiner* — Allen C Wong
(74) *Attorney, Agent, or Firm* — Muncy, Geissler, Olds & Lowe P.C.

(57) ABSTRACT

A recursive discrete Fourier transform (RDFT) of this invention uses an input-decimation technique to reduce the number of input sequences for a recursive-filter so as to decrease the computation cycle of the recursive-filter. Therefore, the time complexity of the RDFT can be minimized, namely, increasing the throughput of the RDFT.

10 Claims, 9 Drawing Sheets

| M | 2 | 4 | 8 | 16 |
|---|---|---|---|---|
| No. of Real MULs | 0 | 0 | 16N | 48N |
| No. of Real ADDs | 2N | 6N | 22N | 54N |
| $\eta_{cycle}$ | 50% | 75% | 87.5% | 93.75% |

| | Recursive-filter | | | | | Output-stage | |
|---|---|---|---|---|---|---|---|
| RDFT | $g_{k,n}$ | $r_{k,n}$ | $X_k$ | $X_{N-k}$ | $2\cos(\frac{2\pi k}{N})$ | $W_N^{\pm k}$ | $W_M^k$ | $W_M^{N-k}$ |
| RIDFT | $F_{k,n}$ | $S_{n,k}$ | $x_n$ | $x_{N-n}$ | $2\cos(\frac{2\pi n}{N})$ | $W_N^{\pm n}$ | $W_M^{-n}$ | $W_M^{-(N-n)}$ |

| Detection time (ms) | DTMF | |
|---|---|---|
| | Detection Mode | Non-Detection Mode |
| | ≥40 | ≥20 |

| Symbol duration (ms) | DRM Robustness Mode | | | | |
|---|---|---|---|---|---|
| | A | B | C | D | E |
| | 26.67 | 26.67 | 20.0 | 16.67 | 2.5 |

Fig. 10

| Design | | Computation cycle | Real MUL | Real ADD |
|---|---|---|---|---|
| Prior art R1 (Goertzel) | | $N(N+1)$ | $2N(N+3)$ | $4N(N+2)$ |
| Prior art R2 (RDCT+RDST) | | $N^2/2$ | $2N(N+3)$ | $4N(N+2)$ |
| Prior art R3 (RDFT) | | $(N/2-1)(N+1)$ | $(N+1)(N-2)$ | $N(4N+14)-4$ |
| Prior art R4 (RDFT w/ CRT) | | $(c+1)N+m(m+1)$ | $2N(m+c+2)$ | $4N(m+c+2)$ |
| Prior art R5 (Multi-RDFT w/ PF/CF Decomp.) | PF² | $Nc+N+2c)/2 +m(m(m+3)/2-2$ | $N(c+1)+m(N+c)$ | $2N(c+2)+2m(N+c)$ |
| | CF³ | $Nc+N+2c)/2 +m(m(m+3)/2-5m+1$ | $N(c+m+12)-4$ | $2N(c+m+5.5)-2$ |
| Prior art R6 (Folded-RDFT w/ PF/CF decomp.) | PF⁴ | △ --- | $2m(c+1)(c/2-1) +c(m+1)(m-1)$ | $4N(c/2-1)+4c +4N(m+1)/2+4m$ |
| Invention (M=4) | | $(3N/4+1)(N/4+1)+N$ | $(3N/4+1)(N/2+2)$ | $(3N/4+1)(N+4)+ (N/2-2)+6N$ |
| #Reduction efficiency $\eta_1/\eta_2$ | | 56.2%/55.5% | 80.6%/58.7% | 77.8%/78.3% |

Fig. 11

| Design | MULs | ADDs | Storage | | | Critical Period |
|---|---|---|---|---|---|---|
| | | | I/P | Temproal/Buffer | Coef. ROM | |
| Prior art R2 | 10 | 17 | $^I318\times24b$ | 0 | $^1318$-word | $T_m+2T_a$ |
| Prior art R3 | 2 | 13 | $^E288\times32b$ | 0 | $^21301$-word | $T_m+2T_a$ |
| Prior art R4 | 4 | 8 | $^E288\times32b$ | $^{IB}4\times11$-word | $^3694$-word | $T_m+2T_a$ |
| Prior art R5 | 6 | 14 | $^E480\times32b$ | $^{IB}8\times20$-word | $H_0$ | $T_m+2T_a$ |
| Prior art R6 | 2 | 4 | 0 | $^{IT}2\times480\times32b$ | $H_0$ | $T_m+2T_a$ |
| Prior art R7 | 4 | 10 | 0 | $^{IT}480\times32b$ $^{IB}30\times32b$ | $H_0$ | $T_m+3T_a$ |
| Invention | #1 | 18 | 0 | $^{IU}64\times28b$ | $HA_0$ | $T_m+2T_a$ |

Fig. 12

RECURSIVE DISCRETE FOURIER TRANSFORM DEVICE

TECHNICAL FIELD

The present invention relates to a recursive discrete Fourier transform (RDFT) device, in particular, to a RDFT device using input-decimation technology.

BACKGROUND OF THE INVENTION

Recursive Discrete Fourier Transform (RDFT) and Recursive Inverse Discrete Fourier Transform (RIDFT) are widely applied in digital signal processing and communication systems. However, the traditional RDFT/RIDFT has a long computation cycle and a high time complexity. At present, many methods for improving above disadvantages have been proposed.

Goertzel ("An Algorithm for the Evaluation of finite Trigonometric series", Amer. Math. Monthly, vol. 65, pp. 34-35, January 1958) (hereinafter referred to as prior art R1) proposed that the N-point DFT is defined as $$X_k = \sum_{n=0}^{N-1} x_n \cdot W_N^{nk}, k = 0, 1, \ldots, N-1 \qquad \text{EQ-1}$$

where n and k are the sample-index and tone-index in the time-domain and frequency-domain, respectively.

$$W_N^{nk} = e^{-j\frac{2\pi nk}{N}}$$

is defined as the twiddle factor (TWF). $x_n$ and $X_k$ are the complex input-sequence and output-sequence, respectively. The equation EQ-1 can be formulated as $$X_k = \sum_{n=0}^{N-1} x_n \cdot W_N^{nk} \cdot W_N^{-Nk} = \qquad \text{EQ-2}$$

$$\sum_{n=0}^{N-1} x_n \cdot W_N^{-k(N-n)} = x_0 \cdot W_N^{-Nk} + x_1 \cdot W_N^{-(N-1)k} + \ldots + x_{N-1} \cdot W_N^{-k} =$$

$$((\ldots (W_N^{-k} + x_1(x_0 \cdot W_N^{-k} + x_1) \cdot W_N^{-k} + x_2) \cdot W_N^{-k} +$$

$$\ldots + x_{N-2}) \cdot W_N^{-k} + x_{N-1}) \cdot W_N^{-k}$$

Without loss of generality, the right-side of the equation EQ-2 can be described as a recursive form and the intermediate output $v_{k,n}$ is derived as $$v_{k,n} = v_{k,n-1} \cdot W_N^{-k} + x_n, n=0,1,\ldots,N \qquad \text{EQ-3}$$

where $v_{k,-1} = 0$. Therefore, a point of DFT output is acquired by sampling $v_{k,n}$ at cycle time n=N, and meanwhile, $x_n$ must be set to zero i.e., $X_k = v_{k,n}|_{n=N}$ and $x_N = 0$. The z-domain transfer function (TF) of the equation EQ-3 is derived as $$H_k(z) = \frac{1}{1 - W_N^{-k} z^{-1}} = \frac{1 - W_N^{-k} z^{-1}}{1 - 2\cos\left(\frac{2\pi k}{N}\right) z^{-1} + z^{-2}} \qquad \text{EQ-4}$$

According to the equation EQ-4, the signal flow graph (SFG) can be established and realized by a second-order recursive filter as shown in FIG. 1.

However, the total computational complexities of the prior art R1 are 2N(N+3) for real multiplication and 4N(N+2) for real addition. In addition, the total computation cycles for N-point DFT operation are N(N+1) containing N redundant cycles. It is clear that the time complexity of prior art R1 is $O(N^2)$.

In order to decrease the number of computation cycles, Van ("VLSI Architecture for the Low-Computation Cycle and Power-Efficient Recursive DFT/IDFT Design", IEICE Trans. on Fundam. Electron., Commun. Comput. Sci., vols. E90-A, no. 8, pp 1644-1652, August 2007) (hereinafter referred to as prior art R2) proposed that the N-point DFT operation as expressed in the equation EQ-1 can be folded using the input strength reduction and hence expressed as $$X_k = \sum_{n=0}^{\frac{N}{2}-1} x_n \cdot W_N^{nk} + \sum_{n=\frac{N}{2}}^{N-1} x_n \cdot W_N^{nk} = \qquad \text{EQ-5}$$

$$\sum_{n=0}^{\frac{N}{2}-1} x_n \cdot W_N^{nk} + \sum_{n=0}^{\frac{N}{2}-1} x_{(N-1-n)} \cdot W_N^{(N-1-n)k} =$$

$$\sum_{n=0}^{\frac{N}{2}-1} (x_n + x_{(N-1-n)} \cdot W_N^{-k}) \cdot \cos\left(\frac{2\pi kn}{N}\right) +$$

$$j \sum_{n=0}^{\frac{N}{2}-1} (-x_n + x_{(N-1-n)} \cdot W_N^{-k}) \cdot \sin\left(\frac{2\pi kn}{N}\right)$$

where the real term and the imaginary term can be viewed as discrete cosine transform (DCT) and discrete sine transform (DST), respectively. Besides, both terms $(x_n + x_{(N-1-n)} \cdot W_N^{-k})$ and $(-x_n + x_{(N-1-n)} \cdot W_N^{-k})$ are defined as $b_{k,n}$ and $q_{k,n}$, respectively. Furthermore, the variable substitution is employed to replace the sample index with the corresponding cos(•) and sin(•) in DCT and DST terms. Therefore, DCT $X_{C,k}$ term can be reformulated as $$X_{C,k} = \sum_{n=\frac{N}{2}-1}^{0} b_{k,(\frac{N}{2}-1-n)} \cdot \cos\left(\frac{2\pi k\left(\frac{N}{2}-1-n\right)}{N}\right) = \qquad \text{EQ-6}$$

$$(-1)^k \sum_{n=0}^{\frac{N}{2}-1} b_{k,(\frac{N}{2}-1-n)} \cdot \cos\left(\frac{2\pi k(n+1)}{N}\right)$$

and DST $X_{S,k}$ term can be reformulated as $$X_{S,k} = \sum_{n=\frac{N}{2}-1}^{0} q_{k,(\frac{N}{2}-1-n)} \cdot \sin\left(\frac{2\pi k\left(\frac{N}{2}-1-n\right)}{N}\right) = \qquad \text{EQ-7}$$

$$(-1)^k \sum_{n=0}^{\frac{N}{2}-1} q_{k,(\frac{N}{2}-1-n)} \cdot \sin\left(\frac{2\pi k(n+1)}{N}\right)$$

where $$\frac{2\pi k}{N} \text{ and } \left(\frac{N}{2} - 1\right)$$

are denoted as $\theta_k$ and t, respectively. In addition, both cos(•) and sin(•) are simplified by using trigonometric functions. Therefore, the summation term in the equation EQ-6 can be formulated as $$\psi_{k,t} = \sum_{n=0}^{t} b_{k,(t-n)} \cdot \cos((n+1)\theta_k) \qquad \text{EQ-8}$$

and the summation term in the equation EQ-7 can be formulated as $$\phi_{k,t} = \sum_{n=0}^{t} q_{k,(t-n)} \cdot \sin((n+1)\theta_k) \qquad \text{EQ-9}$$

Based on Chebyshev polynomials, the equation EQ-8 can be revised as the recursive form and given as $$\psi_{k,t} = \sum_{n=0}^{t} b_{k,(t-n)} \cdot [2\cos(n\theta_k) \cdot \cos(\theta_k) - \cos((n-1)\theta_k)] = \qquad \text{EQ-10}$$

$$2b_{k,t} \cdot \cos(\theta_k) + 2\cos(\theta_k) \sum_{n=0}^{t} b_{k,(t-1-n)} \cdot \cos((n+1)\theta_k) -$$

$$b_{k,t} \cdot \cos(\theta_k) - b_{k,t-1} - \sum_{n=0}^{t-2} b_{k,(t-2-n)} \cdot \cos((n+1)\theta_k) =$$

$$b_{k,t} \cdot \cos(\theta_k) - b_{k,t-1} + 2\cos(\theta_k)\psi_{k,t-1} - \psi_{k,t-2}$$

Likewise, the equation EQ-9 is simplified as $$\phi_{k,t} = 2\cos(\theta_k) \sum_{n=0}^{t-1} q_{k,(t-1-n)} \cdot \sin((n+1)\theta_k) + \qquad \text{EQ-11}$$

$$q_{k,t} \cdot \sin(\theta_k) - \sum_{n=0}^{t-1} q_{k,(t-2-n)} \cdot \sin((n+1)\theta_k) =$$

$$q_{k,t} \cdot \sin(\theta_k) + 2\cos(\theta_k)\phi_{k,t-1} - \phi_{k,t-2}$$

The z-domain TF of the EQ-10 is expressed as $$H_{\psi_k}(z) = \frac{\Psi_k(z)}{B_k(z)} = \frac{\cos\theta_k - z^{-1}}{1 - 2\cos\theta_k z^{-1} + z^{-2}} \qquad \text{EQ-12}$$

The z-domain TF of the EQ-11 is expressed as $$H_{\phi_k}(z) = \frac{\Phi_k(z)}{Q_k(z)} = \frac{\sin\theta_k}{1 - 2\cos\theta_k z^{-1} + z^{-2}} \qquad \text{EQ-13}$$

According to the equations EQ-12 and EQ-13, the signal flow graph (SFG) can be established and realized by two second-order recursive filters as shown in FIG. 2. The two second-order recursive filters can be viewed as RDCT and RDST, where the upper-part and bottom-part represent $H_{\psi_k}(z)$ and $H_{\phi_k}(z)$, respectively.

In summary, the prior art R2 requires a pre-processing to find $b_{k,n}$ and $q_{k,n}$ based on the input strength reduction scheme as derived in the equation EQ-6. The N input sequences are shortened to two $$\frac{N}{2}$$

sequences such that both $$\frac{N}{2}$$

summation terms as derived in the equations EQ-7 and EQ-8 are used to fulfill the entire RDFT calculation. Therefore, the computation cycle of a single DFT output is $$\frac{N}{2},$$

which means that the total computation cycles for N-point DFT are $$\frac{N^2}{2}$$

excluding that of the pre-processing. The time complexity of the prior art R2 is $$O\left(\frac{N^2}{2}\right).$$

Besides, the total computational complexities are 2N(N+3) for real multiplication and 4N(N+2) for real addition.

In order to remove additional operations induced by the redundant cycles of the prior art R1, Lai ("Low Computational Complexity, Low Power, and Low Area Design for the Implementation of Recursive DFT and IDFT Algorithms", IEEE Trans. Circuits Syst. II, Exp. Briefs, vol. 56, no. 12, pp. 921-925, December 2009) (hereinafter referred to as prior art R3) proposed that the variable substitution was used to revise the sample index with corresponding twiddle factor (TWF) in the equation EQ-1. Therefore, the N-point DFT as expressed in the equation EQ-1 can be reformulated as $$X_k = \sum_{n=0}^{N-1} x_n \cdot W_N^{nk}, k = 0, 1, \ldots, \qquad \text{EQ-14}$$

$$N - 1 = W_N^{-k} \left( \sum_{n=0}^{N-1} x_{(N-1-n)} \cdot W_N^{-nk} \right) = W_N^{-k} \cdot \left( x_{(N-1)} + W_N^{-k} \cdot x_{(N-2)} + \right.$$

$$W_N^{-2k} \cdot x_{(N-3)} + \ldots + W_N^{-(N-2)k} \cdot x_1 + W_N^{-(N-1)k} \cdot x_0 \right)$$

Considering the derivation of the recursive form, the equation EQ-14 can be rewritten as $$X_k = W_N^{-k} \cdot (W_N^{-k} \cdot ( \quad . \quad . \quad . \quad (W_N^{-k} \cdot (W_N^{-k} \cdot x_0 \cdot x_1) + x_{N-2}) + \ldots + x_{N-2}) + x_{N-1})$$ EQ-15

Similarly, the right-side of the equation EQ-15 can be expressed as a recursive form and then the intermediate output $u_{k,n}$ can be derived as $$u_{k,n} = W_N^{-k} \cdot (u_{k,n-1} + k_n), \ n=0,1,\ldots,N-1$$ EQ-16 where $u_{k,-1}=0$. Therefore, a single DFT output is obtained by sampling $u_{k,n}$ at cycle time $n=(N-1)$, i.e., $X_k=u_{k,n}|_{n=(N-1)}$. The computation cycle of a single DFT output is N without redundant cycle. The z-domain TF of the equation EQ-16 can be expressed as $$H_k(z) = \frac{W_N^{-k}}{1 - W_N^{-k} z^{-1}} = \frac{W_N^{-k} - z^{-1}}{1 - 2\cos\left(\frac{2\pi k}{N}\right)z^{-1} + z^{-2}}$$ EQ-17

Likewise, the SFG of the equation EQ-17 can be realized by the second-order recursive filter as shown in FIG. 3.

In summary, from the implementation point of view, the computation cycle of a single DFT output is (N+1) because of using two real multipliers to fulfill the recursive filter. In order to further reduce the computation cycle, the symmetric property is employed to obtained $X_k$ and $X_{N-k}$ concurrently. Therefore, the total computation cycles of N-point DFT are $$(N+1)\left(\frac{N}{2} - 1\right),$$

where N is even. The time complexity of Lai's formula is $$O\left(\frac{N^2}{2}\right).$$

Besides, the total computational complexities are (N+1)(N−2) for real multiplication and N(4N+14)−4 for real addition.

Based on the kernel of RDFT derived in the prior art R3, Lai ("Low-Computation-Cycle, Power-Efficient, and Reconfigurable Design of Recursive DFT for Portable Digital Radio Mondiale Receiver", IEEE Trans. Circuits Syst., II, Exp. Briefs, vol. 57, n0. 8, pp. 647-651, August 2010) (hereinafter referred to as prior art R4) further proposes a multicycle dual RDFT architecture which has two RDFT kernels that work in parallel with multicycle. The Chinese reminder theorem (CRT) is employed to decompose N-point into (c×m)-point. Therefore, the dual-RDFT performs the c-point operation first and then the following m-point computation. The computation cycle is N(c+1)+m(m+1). However, it has no benefit for N=256 since c=256 and m=0. In other words, only one RDFT kernel is used in the prior art R4 to carry out the 256-point operation and the computation cycle is the same as that of the prior art R3. Consequently, the time complexities for N=256 and the others (288/176/112-point) are $$O\left(\frac{N^2}{2}\right)$$

and $O(Nc+m^2)$, respectively.

Based on the kernel of RDFT derived in the prior art R3, Lai ("High-Performance RDFT Design for Applications of Digital Radio Mondiale," in Proc. IEEE Int. Symp. Circuits Syst. (ISCAS), May 2013, pp. 2601-2603) (hereinafter referred to as prior art R5) further proposes a multi-RDFT architecture which has three RDFT kernels to realize the entire operation within two-stage processing. The prime-factor (PF)/common-factor (CF) decomposition is used to break N-point into (c×m)-point. Consequently, one of RDFT kernels fulfills the c-point operation in the first stage and then the others two RDFT kernels work in parallel to perform the remaining of m-point computation in the second stage. The computation cycles for PF and CF decomposition are $$\frac{(Nc+N+2c)}{2} + \frac{m(m+3)}{2} - 1 \text{ and } \frac{(Nc+N+2c)}{2} + \frac{m(m+3)}{2} - 5m + 1,$$

respectively. Therefore, the time complexity is $$O\left(\frac{(Nc+m^2)}{2}\right)$$

regardless of PF or CF decomposition.

Based on the kernel of RDFT derived in the prior art R3, Lai ("Low-Power and Optimized VLSI Implementation of Compact Recursive Discrete Fourier Transform (RDFT) Processor for the Computations of RDF and Inverse Modified Cosine Transform (IMDCT) in a Digital Radio Mondiale (DRM) and DRM+ Receiver," J. Low Power Electron. Appl., vol. 3, no. 2, pp. 99-113, May 2013) (hereinafter referred to as prior art R6) further proposes a folded-RDFT architecture which has one RDFT kernel with PF/CF decomposition. Therefore, the single RDFT kernel perform c-point operation first and next fulfills the remaining computation of m-point. The penalty of the folded-RDFT architecture is that the storage requirement is twice of the multi-RDFT architecture proposed by Lai.

Based on the kernel of RDFT derived in the prior art R3, Lai ("Hybrid Architecture Design for Calculating Variable-Length Fourier Transform," IEEE Trans. Circuits Syst., II, Exp. Briefs, vol. 63, no. 3, pp. 279-283, March 2016) (hereinafter referred to as prior art R7) further proposes a RDFT operation of the hybrid architecture which is a configurable architecture with PF/CF decomposition. The hybrid architecture is arranged as radix-$2^2$ single-path delay feedback (SDF) FFT to perform c-point operation first and then configured as RDFT to fulfill the m-point computation. Therefore, the hybrid architecture is an impure RDFT realization.

The RDFT of Goertzel, the RDFT of Van, the RDFT of Lai, the multicycle dual RDFT of Lai and the multi-RDFT of Lai need an input storage to store the input sequences until all outputs are completely obtained by the recursive-filter. The folded-RDFT of Lai and the hybrid RDFT of Lai require some internal storages to keep the input sequences and the temporal data until the required outputs are entirely carried out by the recursive-filter. Therefore, from the real-time processing point of view, the prior arts can not be applied to the broadband communication systems, such as OFDM transmission systems. On the other hand, the time complexity for the prior arts is too large such that the execution time for the prior arts is larger than the duration of an OFDM symbol even if only 8 partial outputs of RDFT/RIDFT.

BRIEF SUMMARY OF THE INVENTION

One of the objectives of the present invention is to provide a recursive discrete Fourier transform device using input-decimation technology.

One of the objectives of the present invention is to provide a recursive discrete Fourier transform device reducing computation cycle.

One of the objectives of the present invention is to provide a recursive discrete Fourier transform device that can be applied to the orthogonal frequency-division multiplexing broadband communication system.

According to the present invention, a recursive discrete Fourier transform device uses M pre-processors to implement an input-decimation operation so as to divide N input signals into M aggregated signals, wherein M is a factor of N. Then, a recursive-filter will perform computations of the M aggregated signals in order so as to generate two output signals.

The RDFT device of this invention uses an input-decimation technique to reduce the number of inputs for a recursive-filter so as to decrease the computation cycle of the recursive-filter. Therefore, the time complexity of the RDFT device can be minimized, namely, increasing the throughput of the RDFT device. From the real-time processing point of view, the RDFT device based on the input-decimation technique can really satisfy the requirement of broadband communication systems.

BRIEF DESCRIPTION OF THE SEVERAL VIEWS OF THE DRAWINGS

FIG. 10 shows the system specifications of DTMF and DRM/DRM+.

FIG. 11 shows a comparison table of computational complexities of the prior art and the present invention.

FIG. 12 shows a comparison table of a hardware resources of the prior art and the present invention.

DETAILED DESCRIPTION OF THE INVENTION

Figure 1:
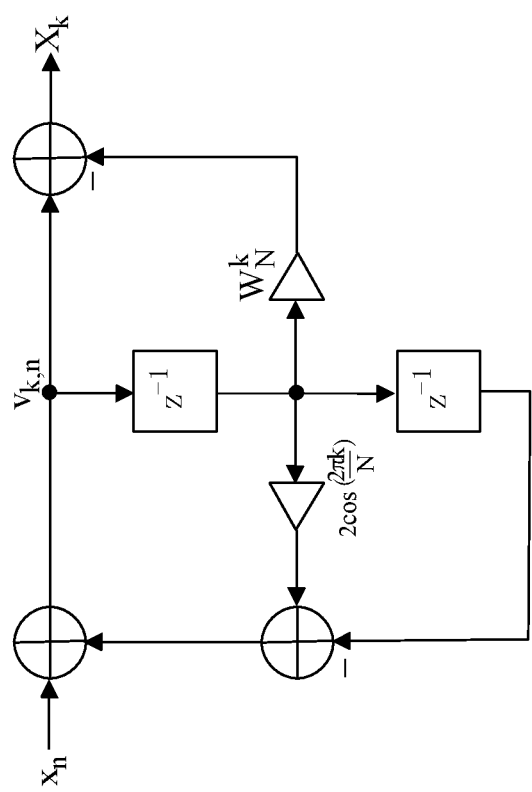
FIG. 1 is a block diagram of a RDFT architecture proposed by Goertzel.
Figure 2:
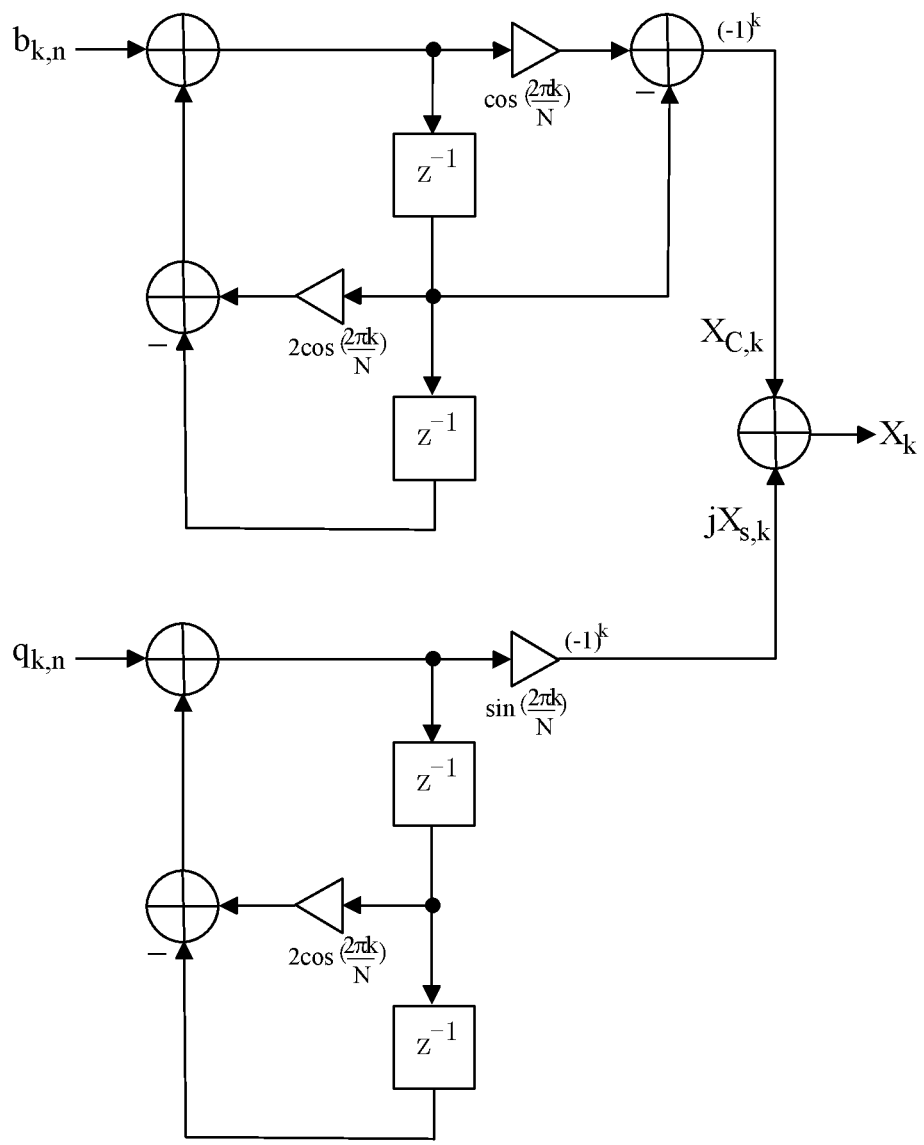
FIG. 2 is a block diagram of a RDFT architecture proposed by Van.

This invention uses an input-decimation technique to reduce the number of input sequences for a recursive-filter so as to decrease the computation cycle of the recursive-filter. The input-decimation technique is a decimation-by-M operation on the input signals $x_n$. The input signals $x_n$ of RDFT are decimated in radix-M first and hence the M decimated signals are combined with the twiddle factors (TWFs) with phase-difference $$\frac{\pi}{M}$$

to form aggregated signals that are fed into a recursive-filter. For a general case, the N-point DFT with decimation-by-M approach can be derived as $$X_k = \sum_{n=0}^{N-1} x_n \cdot W_N^{nk}, k = 0, 1, \ldots ,\qquad \text{EQ-18}$$

$$N-1 = \sum_{n=0}^{\frac{N}{M}-1} \left\{ x_n \cdot x_{\left(n+\frac{N}{M}\right)} \cdot W_N^{k\left(n+\frac{N}{M}\right)} + x_{\left(n+2\frac{N}{M}\right)} \cdot W_N^{k\left(n+2\frac{N}{M}\right)} + \right.$$

$$\left. \ldots + x_{\left[n+(M-1)\frac{N}{M}\right]} \cdot W_N^{k\left[n+(M-1)\frac{N}{M}\right]} \right\} = \sum_{n=0}^{\frac{N}{M}-1} g_{k,n} \cdot W_N^{kn}$$

where n and k are the sample-index and the tone-index in the time-domain and the frequency-domain, respectively. Besides, N and M are integers, where M is a factor of N. The $g_{k,n}$ is defined as an aggregated signal resulting from the input-decimation technique and given as $$g_{k,n} = \qquad \text{EQ-19}$$

$$x_n + x_{\left(n+\frac{N}{M}\right)} \cdot W_N^{k\left(n+\frac{N}{M}\right)} + x_{\left(n+2\frac{N}{M}\right)} \cdot W_N^{k\left(n+2\frac{N}{M}\right)} + \ldots + x_{\left[n+(M-1)\frac{N}{M}\right]} \cdot$$

$$W_N^{k\left[n+(M-1)\frac{N}{M}\right]}$$

Each aggregated signal $g_{k,n}$ is the summation of the M decimated signals with corresponding twiddle factors (TWFs)

$$W_N^{k\left(n+\frac{N}{M}\right)}, W_N^{k\left(n+2\frac{N}{M}\right)}, \ldots , \text{ and } W_N^{k\left[n+(M-1)\frac{N}{M}\right]}.$$

The $g_{k,n}$ can be viewed as the kernel operation of the input-decimation technique. Based on the equation EQ-19, the computational complexity of an aggregated signal $g_{k,n}$ is composed of (M−1) complex multiplications and (M−1) complex additions. The total computational complexities are 4(M−1) for real multiplications and 4(M−1) for real additions.

In the equation EQ-18, the N input signals $x_n$ is shortened to N/M aggregated signal $g_{k,n}$ by using the input-decimation technique. In order to derive the recursive form of the input-decimation technique, the equation EQ-18 can be further reformulated as a convolution operation and given as $$X_k = \sum_{n=\frac{N}{M}-1}^{0} g_{k,(\frac{M}{N}-1-n)} \cdot W_N^{(\frac{N}{M}-1-n)k} = \quad \text{EQ-20}$$

$$W_N^{\frac{N}{M}k} \cdot \left[ \left( \sum_{n=0}^{\frac{N}{M}-1} g_{k,(\frac{M}{N}-1-n)} \cdot W_N^{-nk} \right) \cdot W_N^{-k} \right] = W_M^k \cdot$$

$$\left[ g_{k,(\frac{N}{M}-1)} + g_{k,(\frac{N}{M}-2)} \cdot W_N^{-k} + g_{k,(\frac{N}{M}-3)} \cdot W_N^{-2k} + \dots + g_{k,1} \cdot W_N^{-(\frac{N}{M}-2)k} + g_{k,0} \cdot W_N^{-(\frac{N}{M}-1)k} \right]$$

where $$W_N^{\frac{N}{M}k}$$

is defined as an output twiddle factor (TWF) and simplified as $W_M^k$. Furthermore, the equation EQ-20 can be rewritten as $$X_k = W_M^k \cdot \Big[ \quad\quad\quad\quad\quad\quad\quad\quad\quad\quad\quad\quad\quad\quad \text{EQ-21}$$
$$\left( \left( \dots ((g_{k,0} \cdot W_N^{-k} + g_{k,1}) \cdot W_N^{-k} + g_{k,2}) \cdot W_N^{-k} + \dots + g_{k,\frac{N}{M}-2} \right) \cdot W_N^{-k} + g_{k,\frac{N}{M}-1} \right) \cdot W_N^{-k} \Big]$$

It is clear that the difference equation inside the brackets can be modelled as the recursive form and the intermediate output $r_{k,n}$ can be described as $$r_{k,n} = (r_{k,n-1} + g_{k,n}) \cdot W_N^{-k}, n = 0, 1, \dots, \frac{N}{M} - 1 \quad \text{EQ-22}$$

where $r_{k,-1}=0$. Hence, single DFT output is acquired by sampling $r_{k,n}$ at cycle time $$n = \frac{N}{M} - 1$$

as well as multiplying with $W_M^k$, and given as $$X_k = W_M^k \cdot r_{k,n} \big|_{n=\frac{N}{M}-1} \quad \text{EQ-23}$$

Therefore, the computation cycle of single DFT output is $$\left( \frac{N}{M} - 1 \right)$$

excluding that of input-decimation as derived in the equation EQ-19. The z-domain transfer function (TF) of the equation EQ-23 can be derived as $$H_k(z) = \frac{X_k(z)}{R_k(z)} \cdot \frac{R_k(z)}{G_k(z)} = \quad \text{EQ-24}$$

$$W_M^k \cdot \frac{W_N^{-k}}{1 - W_N^{-k} z^{-1}} = W_M^k \cdot \left\{ \frac{W_M^{-k} - z^{-1}}{1 - 2\cos\left(\frac{2\pi k}{N}\right) z^{-1} + z^{-2}} \right\}$$

Figure 3:
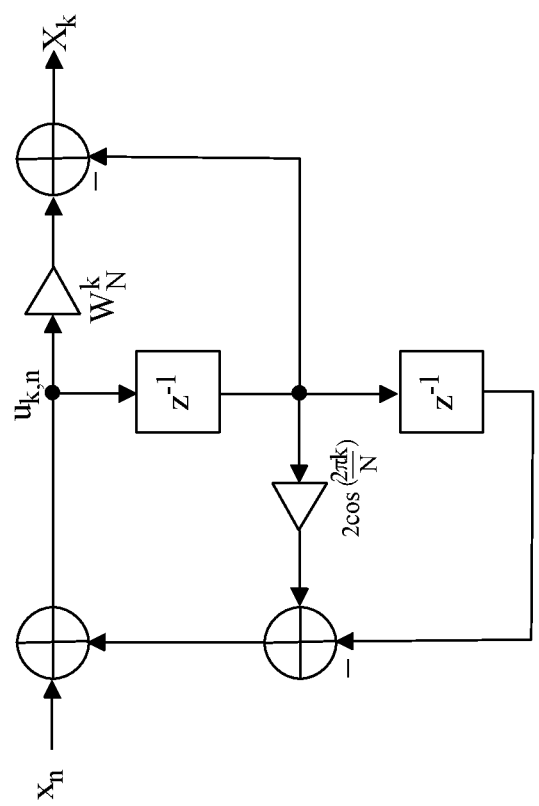
FIG. 3 is a block diagram of a RDFT architecture proposed by Lai.

The equation inside the braces of the EQ-24 is not only the form of recursive-filter but also identical to the equation EQ-17, which means that the SFG of recursive-filter of the equation EQ-24 is the same as that of FIG. 3. However, the inputs of receiver-filter of the equation EQ-24 are $g_{k,n}$, no longer $x_n$. The signal flow graph (SFG) of the equation EQ-24 is as shown in FIG. 4 excluding the related paths of $H_{N-k}(z)$ and composed of a recursive-filter 10 and an output-stage 12.

Figures 4, 5:
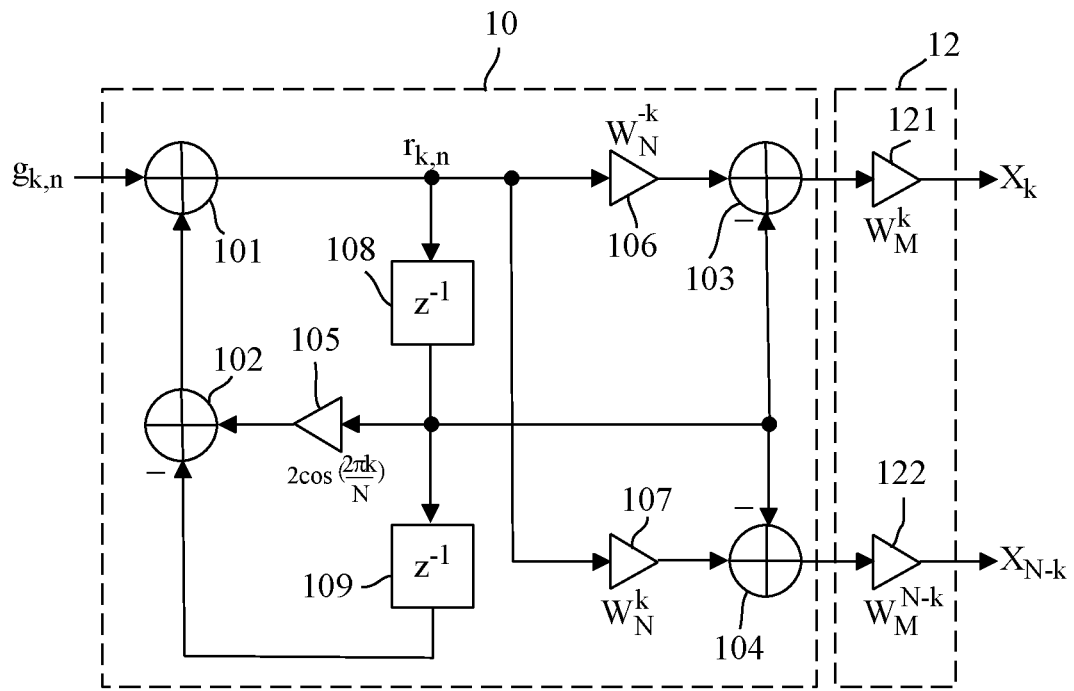
FIG. 4 is a block diagram of a RDFT architecture using input-decimation technique according to the present invention.
FIG. 5 shows a comparison table of the computational complexity of the present invention under different decimation factors M.

FIG. 4 shows a recursive-filter 10 and an output-stage 12 of a RDFT, wherein the recursive-filter 10 includes four adders 101, 102, 103 and 104, three multipliers 105, 106 and 107, and two delay elements 108 and 109, and the output-stage 12 has two multipliers 121 and 122. The delay elements 108 and 109 can be implemented by registers. According to the symmetric property, equations EQ-23 and EQ-24, a symmetrical transfer function (TF) of an output signal $X_{N-k}$ can be derived $H_{(N-k)}(z)$ as:

$$H_{N-k}(z) = \frac{X_{N-k}(z)}{R_{N-k}(z)} \cdot \frac{R_{N-k}(z)}{G_{N-k}(z)} = W_M^{N-k} \cdot \left\{ \frac{W_M^k - z^{-1}}{1 - 2\cos\left(\frac{2\pi k}{N}\right) z^{-1} + z^{-2}} \right\} \quad \text{EQ-25}$$

Obviously, denominators in the braces in the equations EQ-24 and EQ-25 are the same; therefore, the transfer functions $H_k(z)$ and $H_{(N-k)}(z)$ can be implemented by the same circuit, as shown in FIG. 4. In addition, aggregate signals $g_{k,n}$ also have the symmetrical characteristics as below:

$$g_{N-k,n} = g_{k,n} \quad \text{EQ-26}$$

The equation EQ-26 is true if N is a power of 2 and k is even except for k=0 and $$k = \frac{N}{2}.$$

In other words, the circuit in FIG. 4 can simultaneously obtain two output signals $X_k$ and $X_{N-k}$. Based on the symmetric property of trigonometric function on twiddle factors (TWFs), the hardware complexity and the computation cycle of the RDFT circuit in FIG. 4 can be simultaneously reduced.

As mentioned above, the input-decimation technique for RDFT has the following advantages.

Computational complexity: The decimation factor M can not be arbitrarily expanded to reduce the number of aggregated signals without any limitation since the kernel operation of input-decimation will induce plenty of computational complexities. For example, N=64, the computational complexity of the input-decimation as described in the equation EQ-19 for M=2, 4, 8 and 16 is illustrated in FIG. 5. There is no physical multiplication for M=2 and 4 because the TWFs are equal to ±1 and ±j. In addition, for M=8 and 16, both multiplications and additions are much more than those for M=2 and 4. Particularly, for M=16, the requirements of real addition are 27 and 9 times for M=2 and 4, respectively.

Computation cycle: The recursive-filter 10 only requires $$\frac{N}{M}$$

aggregated signals to compute single DFT output. The throughput of RDFT can be definitely improved by the input-decimation approach since the number of computation cycles for the recursive filter is lessened. Therefore, the reduction of computation cycle ($\eta_{cycle}$) is equal to $$\left(1-\frac{1}{M}\right)\times 100\%,$$

as shown in the bottom of FIG. 5, without applying the symmetric property.

As shown in FIG. 5, the larger the M, the higher the computation cycle $\eta_{cycle}$, but more computations are required. Therefore, there is a trade-off between the computation cycle and the computation complexity, and the value of M is changed according to the requirements.

The N-point IDFT with decimation-by-M approach can be derived as $$x_n = \sum_{k=0}^{N-1} X_k \cdot W_N^{-kn} = \sum_{k=0}^{\frac{N}{M}-1} F_{n,k} \cdot W_N^{-kn} \quad \text{EQ-27}$$

where n and k are the sample-index and the tone-index in the time-domain and the frequency-domain, respectively. In addition, N and M are integers, where M is a factor of N. The $F_{n,k}$ is defined as an aggregated signal and given as $$F_{n,k} = \quad \text{EQ-28}$$

$$X_k + X_{\left(k+\frac{N}{M}\right)} \cdot W_N^{-n\left(\frac{N}{M}\right)} + X_{\left(k+2\frac{N}{M}\right)} \cdot W_N^{-n\left(2\frac{N}{M}\right)} + \ldots + X_{\left[k+(M-1)\frac{N}{M}\right]} \cdot W_N^{-n\left[(M-1)\frac{N}{M}\right]}$$

Each aggregated signal $F_{n,k}$ is the summation of the M decimated signals with corresponding TWFs. The $F_{n,k}$ is the kernel operation of the input-decimation technique for RIDFT.

In order to derive the recursive form, the equation EQ-27 can be reformulated as a convolution operation and given as $$x_n = \sum_{k=\frac{N}{M}-1}^{0} F_{n,\left(\frac{N}{M}-1-k\right)} \cdot W_N^{-\left(\frac{N}{M}-1-k\right)n} = \quad \text{EQ-29}$$

$$W_N^{-\frac{N}{M}n} \cdot \left[\left(\sum_{k=0}^{\frac{N}{M}-1} F_{n,\left(\frac{N}{M}-1-k\right)} \cdot W_N^{kn}\right) \cdot W_N^n\right] = W_M^{-n} \cdot$$

$$\left[\left(\left(\ldots\left((F_{n,0} \cdot W_N^n + F_{n,1}) \cdot W_N^n + F_{n,2}\right) \cdot W_N^n + \ldots + F_{n,\left(\frac{N}{M}-2\right)}\right)\right.\right.$$

-continued
$$\left.\left. W_N^n + F_{n,\left(\frac{N}{M}-1\right)}\right) \cdot W_N^n\right]$$

where $W_M^{-n}$ is defined as an output TWF. The difference equation inside the brackets of the equation EQ-29 is modelled as the recursive form and the intermediate output $S_{n,k}$ is described as $$S_{n,k} = (S_{n,k-1} + F_{n,k}) \cdot W_N^n, k = 0, 1, \ldots, \frac{N}{M}-1 \quad \text{EQ-30}$$

where $S_{n,-1}=0$. Hence, a single DFT output is acquired by sampling $S_{n,k}$ at cycle time $$k = \frac{N}{M} - 1$$

as well as multiplying with $W_M^{-n}$ and given as $$x_n = W_M^{-n} \cdot S_{n,k} \Big|_{k=\frac{N}{M}-1} \quad \text{EQ-31}$$

Therefore, the computation cycle of a single DFT output is $$\left(\frac{N}{M}-1\right)$$

excluding that of input-decimation as derived in the equation EQ-28. The z-domain TF of the equation EQ-31 can be derived as $$H_n(z) = \frac{X_n(z)}{S_n(z)} \cdot \frac{S_n(z)}{F_n(z)} = W_M^{-n} \cdot \frac{W_N^n}{1-W_N^n z^{-1}} \quad \text{EQ-32}$$

$$= W_M^{-n} \cdot \left\{\frac{W_N^n - z^{-1}}{1 - 2\cos\left(\frac{2\pi n}{N}\right)z^{-1} + z^{-2}}\right\}$$

The equation inside the braces of the equation EQ-32 can be realized by a second order recursive-filter. Fortunately, the format of the equation EQ-32 is almost the same as that of the equation EQ-24 except for the indexes n and k. The SFG of the equation EQ-32 is as shown in FIG. 6.

Figures 6, 7:
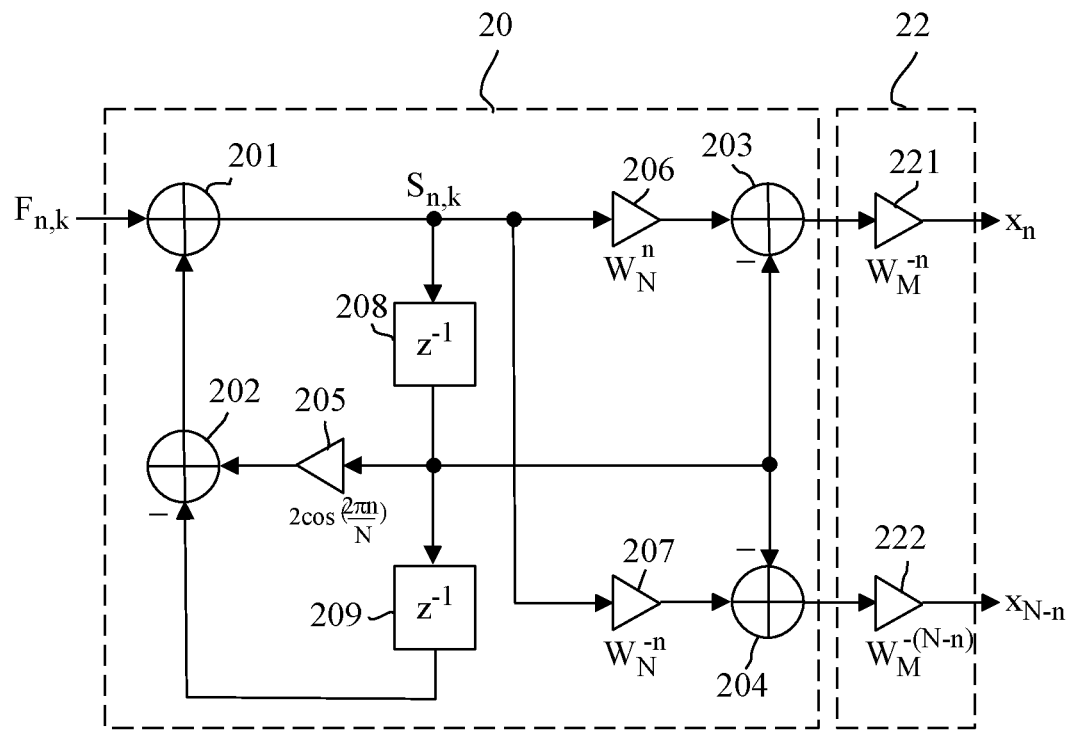
FIG. 6 is a block diagram of a RIDFT architecture using input-decimation technique according to the present invention.
FIG. 7 shows a parameter mapping table in FIG. 4 and FIG. 6.

FIG. 6 shows a recursive-filter 20 and an output-stage 22 of a RIDFT, wherein the recursive-filter 10 includes four adders 201, 202, 203 and 204, three multipliers 205, 206 and 207, and two delay elements 208 and 209, and the output-stage 12 has two multipliers 221 and 222. According to the symmetric property, equations EQ-31 and EQ-32, a symmetrical transfer function (TF) $H_{(N-n)}(Z)$ of an output signal $x_{N-n}$ can be derived as:

$$H_{N-n}(z) = \frac{X_{N-n}(z)}{S_{N-n}(z)} \cdot \frac{S_{N-n}(z)}{F_{N-n}(z)} \quad \text{EQ-33}$$

$$= W_M^{-(N-n)} \cdot \left\{\frac{W_N^{-n} - z^{-1}}{1 - 2\cos\left(\frac{2\pi n}{N}\right)z^{-1} + z^{-2}}\right\}$$

Obviously, denominators in the braces in the equations EQ-32 and EQ-33 are the same. Therefore, the transfer functions $H_n(z)$ and $H_{(N-n)}(z)$ can be implemented by the same circuit, as shown in FIG. 6. In addition, aggregate signals $F_{n,k}$ also have the symmetrical characteristics as below:

$$F_{N-n,k} = F_{n,k} \quad \text{EQ-34}$$

The equation EQ-34 is true if N is a power of 2 and n is even except for n=0 and $$n = \frac{N}{2}.$$

In other words, the circuit in FIG. 6 can simultaneously obtain two output signals $x_n$ and $x_{N-n}$. Based on the symmetric property of trigonometric function on twiddle factors (TWFs), the hardware complexity and the computation cycle of the RIDFT circuit in FIG. 6 can be simultaneously reduced. Like RDFT, the RIDFT using input-decimation technology according to the present invention also has the same advantages in terms of the computation complexity and the computation cycle.

As shown in FIGS. 4 and 6, the architectures of the recursive-filter 10 and the output-stage 12 in the RDFT are the same as the architectures of the recursive-filter 20 and the output-stage 22 in the RIDFT, and the difference is in the parameters of the input signal and the computation. The signal correspondence between FIG. 4 and FIG. 6 is shown in FIG. 7. In other words, the circuit of the present invention may implement the RDFT or RIDFT by changing internal parameters. Therefore, hereinafter both devices that implement the RDFT or the devices that implement RIDFT are collectively referred to as RDFT devices.

Then, the RIDFT with a decimation factor M=4 is taken as an example to illustrate the RDFT device of the present invention. However, the present invention is not limited to this. Those skilled in the art can derive the RDFT device with different decimation factors M through the following description.

Based on the equation EQ-27, the N-point RIDFT with decimation-by-4 is given as $$x_n = \sum_{k=0}^{N-1} X_k \cdot W_N^{-kn} = \sum_{k=0}^{\frac{N}{4}-1} F_{n,k} \cdot W_N^{-kn} \quad \text{EQ-35}$$

According to the equation EQ-28, $F_{n,k}$ can be further expressed as $$F_{n,k} = X_k + X_{(k+\frac{N}{4})} \cdot W_N^{-n(\frac{N}{4})} + X_{(k+\frac{N}{2})} \cdot W_N^{-n(\frac{N}{2})} + X_{(k+\frac{3N}{4})} \cdot W_N^{-n(\frac{3N}{4})} \quad \text{EQ-36}$$

Obviously, there is no physical multiplication in the equation EQ-36 since $$W_N^{-n(\frac{N}{4})} = (j)^n, \; W_N^{-n(\frac{N}{2})} = (-1)^n \text{ and } W_N^{-n(\frac{3N}{4})} = (-j)^n.$$

The N input signals $(X_0, \ldots, X_{N-1})$ are shortened to $$\frac{N}{4}$$

aggregated signals $$\left(F_{n,0}, \cdots, X_{n,\frac{N}{4}-1}\right)$$

for computing single IDFT output. The output $x_n$ can be formulated as a convolution operation and given as $$x_n = \sum_{k=\frac{N}{4}-1}^{0} F_{n,(\frac{N}{4}-1-k)} \cdot W_N^{-(\frac{N}{4}-1-k)n} \quad \text{EQ-37}$$

$$= W_4^{-n} \cdot \left[\left(\sum_{k=0}^{\frac{N}{4}-1} F_{n,(\frac{N}{4}-1-k)} \cdot W_N^{kn}\right) W_N^n\right]$$

$$= W_4^{-n} \cdot \left[\left(\left(\cdots((F_{n,0} \cdot W_N^n + F_{n,1}) \cdot W_N^n + F_{n,2}) \cdot W_N^n + \cdots + F_{n,(\frac{N}{4}-2)}\right) \cdot W_N^n + F_{n,(\frac{N}{4}-1)}\right) \cdot W_N^n\right]$$

where $W_4^{-n}$ is the output TWF. The recursive form and the intermediate output can be expressed as $$S_{n,k} = (S_{n,k-1} + F_{n,k}) \cdot W_N^n, \; k = 0, 1, \cdots, \frac{N}{4}-1 \quad \text{EQ-38}$$

where $S_{n,-1}=0$. A single IDFT output is obtained by sampling $S_{n,k}$ at cycle time $$k = \left(\frac{N}{4}-1\right)$$

as well as multiplying with $W_4^{-n}$, and given as $$x_n = W_4^{-n} \cdot S_{n,k}\big|_{k=\frac{N}{4}-1} \quad \text{EQ-39}$$

The z-domain TFs of $H_n(z)$ and $H_{N-n}(z)$ can be expressed as $$H_n(z) = \frac{X_n(z)}{S_n(z)} \cdot \frac{S_n(z)}{F_n(z)} = \qquad \text{EQ-40}$$

$$W_4^{-n} \cdot \frac{W_N^n}{1 - W_N^{-n}z^{-1}} = W_4^{-n} \cdot \left\{ \frac{W_N^n - z^{-1}}{1 - 2\cos\left(\frac{2\pi n}{N}\right)z^{-1} + z^{-2}} \right\}$$

$$H_{N-n}(z) = \qquad \text{EQ-41}$$

$$\frac{X_{N-n}(z)}{S_{N-n}(z)} \cdot \frac{S_{N-n}(z)}{F_{N-n}(z)} = W_4^{-(N-n)} \cdot \left\{ \frac{W_N^{-n} - z^{-1}}{1 - 2\cos\left(\frac{2\pi n}{N}\right)z^{-1} + z^{-2}} \right\}$$

Figure 8:
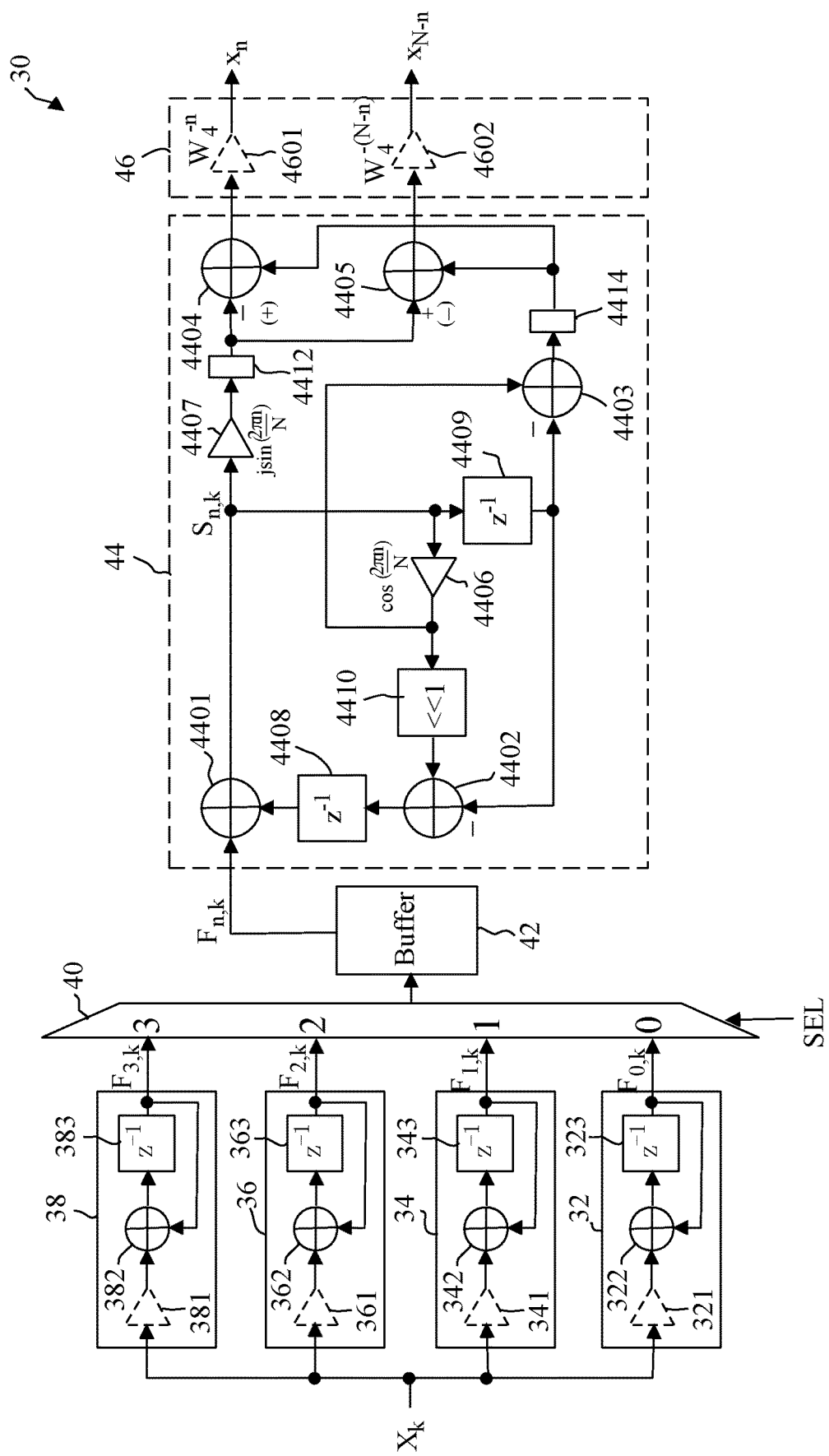
FIG. 8 shows a block diagram of a RIDFT device having a decimation factor M=4 according to the present invention.

According to FIGS. 4 and 6 and equations EQ-35 to EQ-41, an RDFT device 30 with a decimation factor M of 4 can be designed, as shown in FIG. 8. The RDFT device 30 includes four pre-processors 32, 34, 36 and 38, a multiplexer 40, a buffer 42, a recursive-filter 44 and an output-stage 46. The four pre-processors 32, 34, 36 and 38 are used to perform input-decimation on N input signals $X_k$ to generate aggregated signals $F_{0,k}$, $F_{1,k}$, $F_{2,k}$ and $F_{3,k}$, as shown in the equation EQ-36. The four pre-processors 32, 34, 36 and 38 receive the N input signals $X_k$ in turn to divide the N input signals $X_k$ into four groups. Specifically, a first input signal $X_0$ is transmitted to a first pre-processor 32, a second input signal $X_1$ is transmitted to a second pre-processor 34, a third input signal $X_2$ is transmitted to a third pre-processor 36, a fourth input signal $X_3$ is transmitted to a fourth pre-processor 38, and a fifth input signal $X_4$ is transmitted to the first pre-processor 32, and so on. Finally, the pre-processors 32, 34, 36 and 38 may generate M=4 aggregate signals $F_{0,k}$, $F_{1,k}$, $F_{2,k}$ and $F_{3,k}$, each of which has N/M input signals. Each of the pre-processors 32, 34, 36 and 38 has a multiplier 321, 341, 361 and 381, an adder 322, 342, 362 and 382, and a delay element 323, 343, 363 and 383. Taking the pre-processor 32 as an example, the input signal $X_k$ is multiplied by a twiddle factor (TWF) by the multiplier 321, and then added to the previously input signal by the adder 322 to generate the aggregate signal $F_{0,k}$, which is delayed for a period of time by the delay element 323 and then is sent to the adder 322 to be added to the next input signal. The twiddle factor of the multiplier 321 is provided by a circuitry (not shows) such as a memory (RAM or ROM), a lookup table, a hard-wire, a coordinate rotation digital computer (CORDIC), and so on. The pre-processors 32, 34, 36 and 38 repeat the above operations until all N input signals $X_k$ are processed. In FIG. 8, the multipliers 321, 341, 361 and 381 are represented by dotted triangles, which indicates that the multipliers 321, 341, 361, and 381 are non-physical multipliers, i.e., the multipliers 321, 341, 361, and 381 are non-physical multiplications with a twiddle factor (TWF) of +1 or ±j. Therefore, the preprocessors 32, 34, 36, and 38 can be regarded as accumulators that add the input signal $X_k$. FIG. 8 takes the RDFT device 30 performing RIDFT operation as an example; if the RDFT device 30 performs an RDFT operation, the preprocessors 32, 34, 36, and 38 will perform an input-decimation operation on the N input signals $x_n$ to generate the aggregate signal $g_{k,n}$ as shown in the equation EQ-19.

The multiplexer 40 transmits one of the aggregate signals $F_{0,k}$, $F_{1,k}$, $F_{2,k}$ and $F_{3,k}$ to the buffer 42 according to a selection signal, and the buffer 42 stores the aggregate signal $F_{n,k}$ from the multiplexer 40, where n is 0, 1, 2 or 3. The recursive-filter 44 includes adders 4401, 4402, 4403, 4404 and 4405, multipliers 4406 and 4407, delay elements 4408 and 4409, a displacement calculator 4410 and retiming registers 4412 and 4414. The recursive-filter 44 is used to perform the RIDFT computation on the aggregate signal $F_{n,k}$ in the buffer 42. The retiming registers 4412 and 4414 are employed to split the critical path. Therefore, the critical period of the recursive filter is equal to $T_m + 2T_a$, where $T_m$ and $T_a$ express the computing times of the multiplier and the adder, respectively. When the recursive-filter 44 is used to perform the RIDFT operation, the input terminal of the adder 4404 connected to the retiming registers 4412 and 4414 is a negative input terminal and the input terminal of the adder 4405 connected to the retiming registers 4412 and 4414 is a positive input terminal. In contrary, when the recursive-filter 44 is used to perform the RDFT operation, the input terminal of the adder 4404 connected to the retiming registers 4412 and 4414 is a positive input terminal and the input terminal of the adder 4405 connected to the retiming registers 4412 and 4414 is a negative input terminal. In order to reduce the hardware complexity, the module-folding and module-sharing techniques are employed to decrease the number of multipliers in the recursive-filter 44. The TWF ($W_N^{\pm n}$ as shown in FIGS. 6 and 7) in the feedforward path of RIDFT can be decomposed as cos(•) and sin(•) terms, where the cos(•) term is identical to that of feedback path. Therefore, both cos(•) terms can be folded together. Furthermore, in FIG. 8, only one multiplier 4407 is realized to fulfill both cos(•) and sin(•) multiplications since sin(•) multiplication is only active at $$k = \left(\frac{N}{4} - 1\right).$$

The output-stage 46 generates the output signals $x_1$ and $x_{N-n}$ according to the output of the recursive-filter 44, and the output-stage 46 includes two multipliers 4601 and 4602. As shown in FIG. 8, the multipliers 4601 and 4602 are represented by dotted triangles, which means that the $W_4^{-n}$ and $W_4^{-(N-n)}$ is ±1 or ±j, i.e., the multipliers 4601 and 4602 are non-physical multipliers.

In FIG. 8, for the pre-processor, the number of computation cycles is N. In view of computing a single RIDFT/RDFT output, the number of computation cycles for the recursive is $$\left(\frac{N}{4} + 1\right)$$

using one multiplier to perform cos(•) and sin(•) multiplications. Besides, the number of all RIDFT/RDFT outputs is $$\left(\frac{3N}{4} + 1\right)$$

because of the symmetrical characteristics as derived in the equations EQ-26 and EQ-34. The total number of computation cycles for the recursive-filter 44 is $$\left(\frac{3N}{4} + 1\right) \cdot \left(\frac{N}{4} + 1\right).$$

For each pre-processor 32, 34, 36 or 38 as shown in FIG. 8, an aggregated signal $F_{0,k}$, $F_{1,k}$, $F_{2,k}$ or $F_{3,k}$ can be obtained by 3 complex additions (accumulations) that is equal to (M−1), and each pre-processor 32, 34, 36 or 38 needs to calculated $$\left(\frac{N}{4}\right)$$

input signals $X_k$. Consequently, the number of the real additions for the four pre-processors 32, 34, 36 and 38 is 6N that can be expressed as 2N(M−1). The feedback-path of recursive-filter 44 has two real multiplications and two complex additions that perform $$\frac{N}{4}$$

times to obtain a single RIDFT/RDFT output. Besides, the forward-path of recursive-filter has two real multiplications and three complex additions that fulfill once to acquire a single RIDFT/RDFT output at $$k = \left(\frac{N}{4} - 1\right)$$

for RIDFT and at $$n = \left(\frac{N}{4} - 1\right)$$

for RDFT. One of the three complex additions, as located in the middle right of recursive filter 44 is only used to fulfill the symmetrical output of $$\left(\frac{N}{4} - 1\right)$$

excluding the conditions as derived in the equation EQ-26 and EQ-34. The other two complex additions are employed to all RIDFT/RDFT outputs of $$\left(\frac{3N}{4} + 1\right).$$

In conclusion, the total numbers of computation cycles, multiplications and additions for the RDFT device 30 in FIG. 8 are $$\left(\frac{3N}{4} + 1\right) \cdot \left(\frac{N}{4} + 1\right) + N, \left(\frac{3N}{4} + 1\right) \cdot \left(\frac{N}{2} + 2\right)$$

and $$\left(\frac{3N}{4} + 1\right) \cdot (N + 4) + \left(\frac{N}{2} - 2\right) + 6N,$$

respectively. The time complexity is $$O\left(\frac{3N^2}{16}\right).$$

Figure 9:
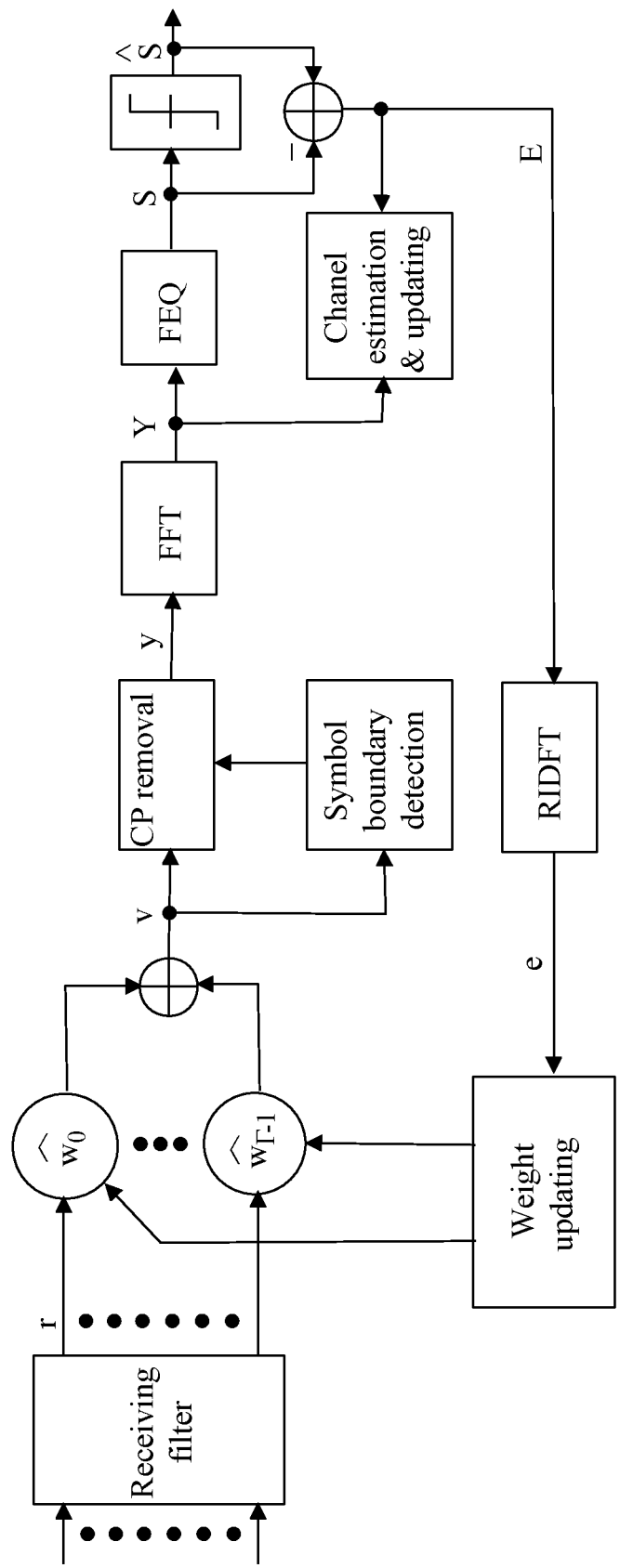
FIG. 9 shows a block diagram of an OFDM applying the present invention.

The input-decimation RIDFT of the present invention is used to assist the beamforming tracking for OFDM receiver as shown in FIG. 9. The RIDFT of the present invention is allocated the feedback path to fulfill the decision error transformation from the frequency domain to the time domain for the weight updating of beamforming. The advantages of applying the present invention to do the beamforming tracking in OFDM receiver are listed as below.

(a) Area-cost: No need an extra inverse FFT (IFFT) placed at the feedback path since the occupied area of FFT is more than 40% of entire digital OFDM inner receiver.

(b) Real-time processing: During the packet reception, the RIDFT has to real-time process the input sequences without input storage, i.e., serial-input and serial-output of RIDFT in the frequency- and time-domain, respectively.

(c) Execution time of RIDFT: Referring to the system specifications of DTMF and DRM/DRM+ as shown in FIG. 10, the requirement of the execution time is at the level of milliseconds, exactly from 2.5 to 4.0 ms. Although the execution time of prior arts can reach around from 80 to 384 μs, these designs can not be applied to the beamforming tracking for IEEE 802.11n OFDM receiver since an OFDM symbol duration with the normal- and short-guard interval for IEEE 802.11n OFDM transceiver are 4.0 and 3.6 μs, respectively.

The computational complexity, as shown in FIG. 11, is a realization indicator to demonstrate the computational feature including the number of computation cycles, real multiplications and real additions. It is crucial that a design with fewer computation cycles has a shorter execution time. Besides, a design with fewer operations of multiplication and addition has a lower computing power, namely, a lower power consumption in hardware realization. In the FIG. 11, The superscript "#" means that the $\eta_1/\eta_2$ is the reduction efficiency of proposed algorithm compared with R2/R3; the superscript "Δ" means that it is NOT reported in R6; the superscript "1" of CRT means that 288-pt w/PF (c=32, m=9) and 256-pt w/o PF/CF (c=256, m=0); the superscript "2" of PF means that 288-pt w/PF (c=32, m=9); the superscript "3" of CF means that 288-pt w/CF (c=18, m=16) and 256-pt w/CF (c=16, m=16); the superscript "4" of PF means that 288-pt w/PF (c=32, m=9).

The demand of hardware resources for various RDFT/RIDFT architectures including multiplier, adder and storage (memory) is also a realization indicator to exhibit the implementation cost such as the occupied area and the power consumption. The hardware resources for various RDFT/RIDFT architectures is shown in FIG. 12. In the FIG. 12, The superscript "E" means that this item is excluded in design; the superscript "I" means that this item is included in design; the superscript "T" means that this item uses for input and temporal storage; the superscript "U" means that this item only uses for temporal storage; the superscript "B" means data buffer; the superscript "H" means hard-wired coefficient; the superscript "#" means that the constant multiplier including signed-digit (SD) coefficients; the superscript "Δ" means that the SD coefficients are merged into the constant multiplier; the superscript "1" means that coefficients for 212-point and 106-point; the superscript "2"

means that coefficients for 288-point, 256-point, 176-point, 112-point, 212-point, 165-point and 106-point; the superscript "3" means that coefficients for 288-point, 256-point, 176-point, and 112-point.

The foregoing description of some preferred embodiments of the present invention serves illustrative purposes only and is not intended to limit the invention precisely to the forms disclosed herein. It is possible to modify or vary the aforesaid embodiments according to the teaching given above or after learning from those embodiments. The embodiments are chosen and described to expound the principle of the invention and to enable a person skilled in the art to implement the invention in various ways. The technical concept of the invention shall be defined by the appended claims and their equivalents.

What is claimed is:

1. A recursive discrete Fourier transform device, comprising:
    M pre-processors, configured to perform an input-decimation operation to divide N input signals into M aggregated signals, wherein M is a factor of N;
    a multiplexer, coupled to the M pre-processors, configured to sequentially output the M aggregated signals;
    a buffer, coupled to the multiplexer, configured to store an outputted aggregated signal output by the multiplexer, wherein the size of the buffer is equivalent to $$\frac{N}{M};$$

a recursive-filter, coupled to the buffer, configured to receive the output aggregated signals from the buffer and configured to perform a computation on the outputted aggregated signal; and
    an output-stage, coupled to the recursive-filter, generating two output signals according to the output of the recursive-filter.

2. The recursive discrete Fourier transform device according to claim 1, wherein each of the pre-processors comprises:
    a multiplier, configured to multiply one of the N input signals by a twiddle factor;
    an adder, having an input terminal coupled to an output terminal of the multiplier; and
    a delay element, having an input terminal coupled to an output terminal of the adder and an output terminal coupled to the input terminal of the adder and the multiplexer;
    wherein an output of the delay element is fed back to the adder, so that N/M input signals input to each of the pre-processors are accumulated by the adder, and the delay element generates one of the M aggregated signals to the multiplexer.

3. The recursive discrete Fourier transform device according to claim 2, wherein the twiddle factor is provided by a circuitry.

4. The recursive discrete Fourier transform device according to claim 3, wherein the circuitry comprises a memory.

5. The recursive discrete Fourier transform device according to claim 4, wherein the memory comprises a RAM or a ROM.

6. The recursive discrete Fourier transform device according to claim 3, wherein the circuitry comprises a lookup table.

7. The recursive discrete Fourier transform device according to claim 3, wherein the circuitry comprises a hard-wire.

8. The recursive discrete Fourier transform device according to claim 3, wherein the circuitry comprises a coordinate rotation digital computer.

9. The recursive discrete Fourier transform device according to claim 1, wherein M=4.

10. The recursive discrete Fourier transform device according to claim 1, wherein M=2.

* * * * *